United States Patent [19]

Milner et al.

[11] Patent Number: 4,945,015
[45] Date of Patent: Jul. 31, 1990

[54] INTUMESCENT MATERIAL

[75] Inventors: Bruce A. Milner, Sawston; Tessa Malcolm-Brown, Pampisford; Eric Southern, Stevenage, all of England

[73] Assignee: Dixon International Limited, Pamisford, England

[21] Appl. No.: 340,297
[22] PCT Filed: Sep. 17, 1987
[86] PCT No.: PCT/GB87/00650
 § 371 Date: Mar. 13, 1989
 § 102(e) Date: Mar. 13, 1989
[87] PCT Pub. No.: WO88/02019
 PCT Pub. Date: Mar. 24, 1988

[30] Foreign Application Priority Data

Sep. 17, 1986 [GB] United Kingdom ............... 8622341
Sep. 23, 1986 [GB] United Kingdom ............... 8622823
Sep. 26, 1986 [GB] United Kingdom ............... 8623157

[51] Int. Cl.$^5$ ........................................... C09K 21/14
[52] U.S. Cl. ................................. 523/179; 521/82; 521/92; 521/97; 521/181; 521/149
[58] Field of Search ............... 521/82, 149, 181, 149; 523/179

[56] References Cited

U.S. PATENT DOCUMENTS 4,698,369 10/1987 Bell ........................................ 521/906
4,722,945 2/1988 Wood et al. ........................ 521/907

FOREIGN PATENT DOCUMENTS 1404822 9/1975 United Kingdom .
1497118 1/1978 United Kingdom .
2012296 7/1979 United Kingdom .

Primary Examiner—Morton Foelak
Attorney, Agent, or Firm—Bucknam and Archer

[57] ABSTRACT

An intumescent material comprises expandible graphite in a polymeric binder. The binder may be a flexible or elastomeric binder or a formaldehyde resin. A suitable flexible binder is a polymer selected from vinyl acetate polymers, styrene polymers, vinyl chloride polymers, acrylic polymers, vinyl butyral polymers, melamine/urea/phenol formaldehyde resins, polyesters and phenolic resins. A suitable elastomeric binder is a rubber. A suitable formaldehyde resin is melamine formaldehyde resin, urea formaldehyde resin, phenol formaldehyde resin or resorcinol formaldehyde resin.

9 Claims, No Drawings

INTUMESCENT MATERIAL

The present invention relates to intumescent material comprising expandible graphite in a polymeric binder.

In accordance with the present invention there is provided an intumescent material comprising expandible graphite in a polymeric binder.

The intumescent material may further comprise at least one constituent selected from fillers and reinforcing agents.

The intumescent material may be made by preparing a mixture of the expandible graphite, the polymeric binder and a liquid and causing or allowing the mixture to harden.

Normally the intumescent material is non-foamed or non-cellular i.e. free of pores or cells.

Accordingly to a first aspect of the invention, the binder is a flexible or elastomeric binder.

In the first aspect of the invention, the graphite is preferably present in an amount of 15 to 60% by weight based on the combined weight of the binder and graphite. Preferably the graphite is present in an amount of at least 20% by weight based on the combined weight of the binder and graphite. Preferably also the graphite is present in an amount not exceeding 55% by weight based on the combined weight of the binder and graphite.

Preferably, also in the first aspect of the invention, the binder and the graphite are present in a total amount of at least 70% by weight based on the weight of the intumescent material.

The intumescent material according to the first aspect of the invention may comprise a plasticizer. The amount of the plasticizer preferably does not exceed 15% by weight based on the weight of the intumescent material. A suitable plasticizer is dibutyl phthalate.

The intumescent material according to the first aspect of the invention may be made by preparing a mixture of the expandible graphite, the polymeric binder and water and causing or allowing the mixture to harden. Hardening may occur at least in part due to evaporation of water.

The mixture may be liquid or formulated as a dough moulding compound.

The flexible binder may be or comprise a polymer selected from vinyl acetate polymers, styrene polymers, vinyl chloride polymers, acrylic polymers, vinyl butyral polymers, melamine/urea/phenol formaldehyde resins, polyesters and phenolic resins.

Where the binder is an elastomeric binder, the intumescent material preferably comprises 40 to 70% by weight of the binder and 25 to 60% by weight of the expandible graphite based on the combined weight of the binder and graphite.

The intumescent material may be made by preparing a mixture of the expandible graphite and a liquid emulsion or dispersion of the elastomeric binder and causing or allowing the mixture to cure by coagulation or cross-linking of the elastomeric binder.

Suitable emulsions or dispersions of the elastomeric binder may comprise Neoprene latex 115 and Neoprene latex 671. These latices are marketed by Du Pont. Neoprene latex 115 is described as a chloroprene copolymer with carboxyl functionality of pH 7. Neoprene latex 671 is described as polychloroprene in anionic colloidal system, pH 12.5.

It may be advantageous to add one or more organic accelarators such as thiocarbanilide, diphenylguanidine or hexamethylenediamine to the emulsion or dispersion of the elastomer.

The elastomeric binder may be a rubber.

The elastomeric binder is preferably fire- or flame-resistant and/or self-extinguishing.

According to a second aspect of the invention, the binder is a thermosetting formaldehyde resin. Such a resin is normally rigid (i.e. substantially non-flexible and non-elastomeric).

The thermosetting binder may be, for example, melamine formaldehyde resin, urea formaldehyde resin, phenol formaldehyde resin, resorcinol formaldehyde resin or a mixture of two or more of these resins. Melamine formaldehyde resin is particularly preferred as the thermosetting binder because it provides an intumescent material which can intumesce smoothly and free of sputtering of graphite particles.

The thermosetting binder may incorporate a minor proportion of one or more of the flexible polymers referred to above in order to improve the flexural properties and to reduce shrinkage of the binder.

The intumescent material may comprise 20 to 60% by weight of melamine formaldehyde resin as the binder (calculated as uncross-linked resin) and 10 to 50%, more preferably 10 to 40%, by weight of the expandible graphite.

Preferably the amount of the expandible graphite is in the range of 20 to 60% by weight based on the total weight of the binder and graphite.

The intumescent material may be made by preparing a mixture of the expandible graphite and the binder and causing or allowing the mixture to harden by curing or cross-linking of the binder.

The intumescent material according to the invention may expand, forming a solid foam or puff, to 8 to 25 times its original volume on heating to elevated temperature.

The intumescent material according to the invention is fire resistant. Specifically, the solid form or puff formed on heating the material is fire-resistant.

The intumescent material according to the invention is fire resistant. Specifically, the solid form or puff formed on heating the material is fire-resistant.

As mentioned above, the intumescent material according to the invention may comprise one or more reinforcing agents and/or fillers. Such reinforcing agents and fillers may be selected from glass fibre, cellulose-based fibre, chopped tissue, rockwool, china clay, chalk, gypsum, silicas and mineral silicates e.g. calcium silicate.

The intumescent material according to the invention may comprise, apart from the graphite, the polymeric binder, any plasticiser, any liquid (such as water or volatile organic liquid) derived from the manufacture of the material, any reinforcing agent, any filler and any catalyst, substantially no other component apart from any incidental impurities which may be present.

As mentioned above, the intumescent material of the invention may be made by a process comprising preparing a mixture of the expandible graphite, the polymeric binder and a liquid and causing or allowing the mixture to harden.

The liquid may be water or an organic solvent. The graphite is dispersed (in particulate form) in the liquid and the polymeric binder is dispersed or dissolved in the liquid. Preferably the mixture is formulated as a viscous liquid mixture. The mixture may alternatively be formulated as a dough moulding compound for press moulding or extrusion. One or more reinforcing agents and/or fillers such as described above may be included in the mixture. The mixture may be formulated to be almost self-levelling.

The dough moulding compound may be easily extruded into almost immediately handleable strips of the required dimensions, is unexpectedly tough after drying (e.g. carried in an oven at 60° C. or by prolonged standing at room temperature), is resistant to creep on heating up to 200° C. and does not need reinforcement to be incorporated.

The mixture may be moulded into sheets of any convenient shape and cured to form the intumescent material or applied as a coating to a substrate and then cured to form the intumescent material.

Curing may be effected at ambient temperature particularly where the liquid mixture is in the form of a thin coating or layer. However, it may often be preferable to effect curing at elevated temperature, such as 50° to 60° C., such temperature obviously having to be kept below a temperature at which intumescence of the graphite or rapid dissolution of dissolved air (which would cause bubbles to form in the liquid mixture) would occur.

In the first aspect of the invention, it is believed that curing is effected generally mainly by evaporation of water (or other liquid). However, curing may occur additionally or alternatively by cross-linking of the polymeric binder.

Where the binder is a rubber, one or more compounds selected from oxides and salts of metals, such as zinc, may be used to accelerate hardening of the rubber. Zinc borate is a suitable zinc salt for this purpose.

It has been found that the intumescent material according to the first aspect of the invention and made by the above-described method is flexible and is not adversely affected by carbon dioxide and moisture. In fact the material is virtually waterproof.

In the second aspect of the invention hardening of the mixture may occur wholly or mainly by cross-linking or curing of the thermosetting resin. The mixture may be cured at, e.g. around 60° C., between platens in a heated press. The platens may have a covering of e.g. polyethylene sheets, to prevent adhesion of the intumescent material to the platens.

In the second aspect of the invention the liquid mixture may further comprise one or more of: water, a hardener or catalyst, a filler, dicyandiamide (or other polyamido compound), and another polymeric binder.

The hardener or catalyst or dicyandiamide (or other polyamido compound) may act to cross-link or cure the thermosetting resin.

The hardener or catalyst may be an acid catalyst or hardener.

Suitable catalyst or hardeners include hydrochloric acid, sulphuric acid, phosphoric acid, organic acids such as formic acid, acetic acid, maleic acid, malic acid, tartaric acid and citric acid, ammonium phosphates and alkali metal phosphates.

The invention further provides:

a structure defining a gap and including an intumescent material according to the invention, the intumescent material being arranged so that at elevated temperature as under fire conditions when the material intumesces it closes the gap;

an intumescent seal comprising a coherent and self-supporting body of intumescent material according to the invention; the body preferably being shaped to form the seal; and an intumescent seal comprising a holder and intumescent material according to the invention, the intumescent material expanding from the holder at elevated temperature as under fire conditions.

The intumescent material according to the first aspect of the invention has the following advantages and features:

1. It is tough, flexible, non-friable and malleable and can be formed into strips with these properties.

2. It can be applied to substrates, such as door rebates, by inexpensive adhesive, e.g. polyvinyl alcohol, or by self-adhesive strip or tacks.

3. The material can be manufactured to any required thickness and needs no added protection.

4. The material when cured is completely resistant to carbon dioxide, and water and can withstand prolonged exposure to water without its intumescent properties being affected.

5. The material exhibits considerable expansion force on heating.

6. The material can be bent to almost any radius without breaking or fracturing.

With regard to Advantages 1 and 6 above, the intumescent material is unexpectedly flexible as compared with the thermoplastic polymer itself. This is perhaps because of an internal lubricating effect of the graphite.

Preferably formulations of the liquid mixture according to the second aspect of the invention are in accordance with the table below:

TABLE

| Components or ingredients | Range of components | Preferred range of components |
|---|---|---|
| Formulation I | | |
| Melamine formaldehyde | 35–50 p.b.w. | 40–50 p.b.w. |
| Expandible graphite | 10–40 p.b.w. | 15–35 p.b.w. |
| Aqueous formic acid solution (calculated as 50% w/w) | 3–10 p.b.w. | 4–7 p.b.w. |
| Additional water | 15–30 p.b.w. | 18–25 p.b.w. |
| Formulation II | | |
| Melamine formaldehyde | 15–35 p.b.w. | 20–30 p.b.w. |
| Dicyandiamide | 5–15 p.b.w. | 10–20 p.b.w. |
| Monoammonium phosphate | 5–20 p.b.w. | 5–10 p.b.w. |
| Expandible graphite | 10–40 p.b.w. | 10–35 p.b.w. |
| Water | 15–35 p.b.w. | 20–30 p.b.w. |
| Formulation III | | |
| Melamine formaldehyde | 20–40 p.b.w. | 25–35 p.b.w. |
| Monoammonium phosphate | 5–15 p.b.w. | 5–10 p.b.w. |
| Expandible graphite | 10–40 p.b.w. | 15–35 p.b.w. |
| Vinyl acetate-ethylene copolymer | 0–15 p.b.w. | 5–10 p.b.w. |
| Water | 5–30 p.b.w. | 10–20 p.b.w. | p.b.w. = parts by weight

For each formulation parts by weight are preferably based on a total of 100 parts by weight of the components listed in the Table.

The melamine formaldehyde referred to in the Table is substantially uncross-linked initially when incorporated into the liquid mixture.

The second aspect of the invention as described herein and using a thermosetting resin as binder has the following advantages:

1. The liquid mixture will cure to form the intumescent material within 1 to 2 hours when pumped into a suitable holder of e.g. aluminium or polyvinyl chloride (pvc). It is unnecessary to allow for evaporation of water to effect hardening.

2. The liquid mixture sets to a hard solid which can be machined to a desired shape.

3. The hardened solid intumescent material is substantially completely resistant to carbon dioxide and water vapour and can withstand prolonged exposure to water without its intumescent properties being affected.

4. The hardened intumescent material exerts a considerable expansion force on being heated to elevated temperature.

5. The intumescent material has an unexpectedly smooth, and hence aesthetically pleasing surface.

6. The intumescent material may be moulded, or otherwise shaped, to form an intumescent seal, which may be elongate and of substantially uniform cross-section (or of any other shape), and does not require a holder since the material itself is sufficiently coherent, sufficiently strong and has a sufficient degree of rigidity to form the seal itself and itself provides a suitable, aesthetically acceptable, surface for the seal. The seal may itself be shaped, e.g. by the provision of a re-entrant or undercut groove along its length, so that it may itself act as a holder for a smoke seal or other resilient sealing member.

7. The hardness of the intumescent material and the lack of need for a holder make it suitable for use in vandal-resistant seals.

8. The intumescent material unexpectedly has the property of delayed intumescence. I.e. it does not start to intumesce immediately on being raised to a high temperature. This is of particular advantage in certain circumstances.

Intumescent material according to the invention may be used as sealing strips for doors and windows, in pipe closures as a pressure and gap filling sealant, as coating on ventilator grilles or as material from which ventilator grilles are moulded, in penetration seals, in glazing panels and other panels, in hinges, locks and in other situations where conflagration needs holding back.

The intumescent material according to the invention may have a very low toxicity.

The invention is illustrated by the following examples. Examples 1, 4, 5 and 6 relate to the first aspect of the invention. Examples 2 and 3 relates to the second aspect of the invention.

The expandible graphite used in the examples is particulate. It was obtained from Foseco Technik Limited and was in the form of free-flowing platelets.

EXAMPLE 1

35 parts by weight of expandible graphit 61 parts of weight of Vinamul 9340 and 4 parts by weight dibutyl phthalate were mixed together to form a viscous liquid mixture. The liquid mixture was cured at 50°-60° C. The cured product was a tough flexible malleable intumescent material.

Vinamul 9340 is an aqueous emulsion or dispersion of vinylacetate/ethylene copolymer manufactured by Vinamul Limited of Carshalton, Surrey, England. Vinamul 9340 comprises 60% by weight of polyvinylacetate and 5% by weight dibutyl phthalte as plasticiser.

The viscous liquid mixture comprised:

| | |
|---|---|
| 35 parts by weight expandible graphite | |
| 36.6 parts by weight vinylacetate/ethylene copolymer | |
| 21.35 parts by weight water | |
| 7.05 parts by weight plasticiser | |
| Total 100 parts by weight | |

The following test was carried out to measure the expansion force of the material.

A strip of material prepared in accordance with this example and having a cross section of 2 mm × 10 mm was heated. A force of approximately 1000 Newtons per meter length of the strip was generated. This compares well with Palusol, a proprietary sodium silicate based intumescent product, up to about 320° C. and much more favourably at higher temperatures.

EXAMPLE 2

A mixture of the following ingredients was prepared.

| | |
|---|---|
| Aerolite 308 | 46 p.b.w. |
| Expandible graphite | 28 p.b.w. |
| Water | 20 p.b.w. |
| Aqueos formic acid (50% w/w) | 6 p.b.w. |

Aerolite 308 is a substantially uncross-linked melamine formaldehyde resin supplied Ciba-Geigy. The mixture was a viscous but virtually self-levelling liquid which, at 20 degrees C., sets to a fairly hard mass within 2 hours. It was found that the rate of hardening could be accelerated by increasing the temperature.

EXAMPLE 3

A mixture of the following ingredients was prepared.

| | |
|---|---|
| Melamine formaldehyde resin | 37 p.b.w. |
| Monoammonium phosphate | 7 p.b.w. |
| Expandible graphite | 30 p.b.w. |
| Vinamul 9340 | 7 p.b.w. |
| Water | 19 p.b.w. |

This formulation is more shrink resistant than the mixture of Example 2, but is also virtually self levelling, setting to a hard mass within 2 hours at 20° C.

EXAMPLE 4

A mixture of the following ingredients was prepared.

| | |
|---|---|
| Neoprene latex 115 | 65.5 p.b.w. (approx. 50% solids) |
| Expandible graphite | 27 p.b.w. (approx. 50% solids) |
| Zinc Oxide | 1.5 p.b.w. (approx. 50% solids) |
| Zinc borate | 3 p.b.w. (approx. 50% solids) |
| Water | 3 p.b.w. (approx. 50% solids) |

The mixture was then cured. The curing is accelerated by increasing the temperature to 60° C. Alternatively, the mixture can be thickened with suitable fillers and cured by a two stage pressing process at 60° C., the excess water being allowed to evaporate after the first pressing, the partially cured sheet being then layered into small pieces and again pressed. The resulting sheet is tough and elastic.

EXAMPLE 5

A mixture of the following ingredients was prepared.

| MR Revultex latex | 55 p.b.w. (approx. 60% solids) |
| --- | --- |
| Expandible graphite | 43 p.b.w. |
| Zinc | 2 p.b.w. | this mixture was a material of dough-like consistency. The material was cured by initially pressing at 60° C. for 5 minutes to form a sheet, allowing the sheet to "breathe" for a further 5 minutes to allow the excess water to evaporate and then reforming the sheet under pressure for a further 5 minutes and allowing the sheet to dry.

MR Revultex latex is a pre-vulcanised natural rubber latex marketed by Revertex Limited of Harlow, England.

It is envisaged that a heat-sensitive coagulant such as polyvinyl methyl ether (e.g. as marketed under the trade name "Lutonal") could be included in the abovementioned mixture.

EXAMPLE 6

A mixture of the following ingredients were prepared

| Vinapol 1080 powder | 25 p.b.w. |
| --- | --- |
| Dibutyl phthalate | 2 p.b.w. |
| Water | 5 p.b.w |
| Expandible graphite | 36 p.b.w. |
| Vinamul 9340 | 32 p.b.w. |

This mixture was of dough like consistency and could be moulded by extrusion or press moulding. After drying the material was tough and flexible.

We claim:

1. A non-foamed intumescent material comprising: 40 to 70% by weight of a copolymer of vinyl acetate and ethylene as a flexible polymeric binder, and 15 to 60% by weight of expandable graphite, the percentages being based on the combined weight of said copolymer and said graphite.

2. The material according to claim 1 made by preparing a mixture of the expandable graphite, the polymeric binder and a liquid and causing said mixture to harden at a temperature lower than the temperature at which said graphite would intumesce.

3. An intumescent material according to claim 1, wherein the graphite is present in an amount of at least 20% by weight and not exceeding 55% by weight.

4. The intumescent material according to claim 1 wherein the binder and graphite are present in a total amount of at least 70% by weight.

5. The material according to claim 2 wherein said liquid is water, and the mixture is in the liquid form or as a dough molding compound.

6. The intumescent material according to claim 1 additionally containing at least one member selected from the group consisting of plasticizers, fillers, catalysts and reinforcing agents.

7. The material according to claim 6 which contains a plasticizer in the amount of up to 15% of the combined weight of said graphite and said copolymer.

8. An intumescent seal formed by shaping the material according to claim 1.

9. The intumescent material according to claim 2 prepared from a mixture of 35 parts of said graphite, 61 parts of an aqueous emulsion or dispersion containing 60% of said vinyl acetate/ethylene copolymer, said aqueous emulsion or dispersion additionally containing 5% by weight of dibutyl phthalate.

* * * * *